United States Patent
Liu et al.

(10) Patent No.: US 11,488,234 B2
(45) Date of Patent: Nov. 1, 2022

(54) METHOD, APPARATUS, AND SYSTEM FOR PROCESSING ORDER INFORMATION

(71) Applicant: Tencent Technology (Shenzhen) Company Limited, Shenzhen (CN)

(72) Inventors: Wenqing Liu, Shenzhen (CN); Zixi Shen, Shenzhen (CN); Qiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1135 days.

(21) Appl. No.: 15/685,279

(22) Filed: Aug. 24, 2017

(65) Prior Publication Data

US 2017/0352090 A1    Dec. 7, 2017

Related U.S. Application Data

(63) Continuation-in-part of application No. PCT/CN2016/082618, filed on May 19, 2016.

(30) Foreign Application Priority Data

Aug. 5, 2015  (CN) .......................... 201510474158.7

(51) Int. Cl.
*G06Q 20/12*   (2012.01)
*G06Q 20/32*   (2012.01)
(Continued)

(52) U.S. Cl.
CPC ......... *G06Q 30/0635* (2013.01); *G06Q 20/12* (2013.01); *G06Q 30/0641* (2013.01);
(Continued)

(58) Field of Classification Search
CPC ............... G06Q 30/0635; G06Q 20/12; G06Q 30/0641; H04W 4/80; H04W 12/001; H04W 4/24
See application file for complete search history.

(56) References Cited

U.S. PATENT DOCUMENTS 10,546,204 B1 *   1/2020   Kumar ............... G06K 9/00671
2008/0319905 A1 * 12/2008   Carlson ................. G06Q 40/02
                                                        705/44
(Continued)

FOREIGN PATENT DOCUMENTS

CN    203812271 U    9/2014
CN    104182871 A   12/2014
(Continued)

OTHER PUBLICATIONS

CN104182871_MachineTranslation; "Mobile Payment System and Smart Wristband"; Zhong Yiming; Feb. 19, 2014 (Year: 2014).*
(Continued)

*Primary Examiner* — John W Hayes
*Assistant Examiner* — Edgar R Martinez-Hernandez
(74) *Attorney, Agent, or Firm* — Morgan, Lewis & Bockius LLP

(57) ABSTRACT

Embodiments of the present invention relate to a method, an apparatus, and a system for processing order information. The method includes receiving, by means of a short-range communication component, order information sent by a first terminal, the order information including an account identifier of a paid object account and a payment amount; acquiring an account identifier of a first account prestored at the second terminal and bound thereto as an account identifier of a payout account and add the account identifier of the payout account to the order information; performing encryption processing, by using a prestored first key, on the order information to which the account identifier of the
(Continued)

payout account is added; and sending, by means of the short-range communication component, the encrypted order information to the first terminal. By the embodiments of the present invention, efficiency of order information can be improved.

17 Claims, 8 Drawing Sheets

(51) Int. Cl.
G06Q 20/38 (2012.01)
G06Q 30/06 (2012.01)
H04W 12/02 (2009.01)
H04W 4/24 (2018.01)
H04W 4/80 (2018.01)
H04W 12/03 (2021.01)

(52) U.S. Cl.
CPC .............. *H04W 4/24* (2013.01); *H04W 4/80* (2018.02); *H04W 12/03* (2021.01)

(56) References Cited

U.S. PATENT DOCUMENTS

| | | | | |
|---|---|---|---|---|
| 2012/0259782 A1* | 10/2012 | Hammad | G06Q 20/382 | 705/44 |
| 2013/0346209 A1* | 12/2013 | Longhenry | G06Q 30/0217 | 705/14.64 |
| 2014/0052630 A1* | 2/2014 | Bona | G06Q 20/34 | 705/41 |
| 2014/0368336 A1* | 12/2014 | Felix | G08B 21/02 | 340/539.13 |
| 2015/0073992 A1* | 3/2015 | Weiner | G06Q 20/3278 | 705/44 |
| 2015/0348025 A1* | 12/2015 | Brown | G06Q 20/12 | 705/41 |
| 2016/0019536 A1* | 1/2016 | Ortiz | G06Q 20/3227 | 705/67 |
| 2016/0270048 A1* | 9/2016 | Kim | H04W 4/08 | |
| 2016/0275511 A1* | 9/2016 | Buchholtz | G06Q 20/425 | |
| 2017/0017958 A1* | 1/2017 | Scott | G06Q 20/12 | |
| 2017/0039535 A1* | 2/2017 | Park | G06F 3/0488 | |
| 2017/0213212 A1* | 7/2017 | Dicker | G06Q 20/3821 | |
| 2017/0236122 A1* | 8/2017 | Kurapati | G06Q 30/0269 | 705/44 |
| 2018/0018704 A1* | 1/2018 | Tunnell | G06Q 30/0269 | |
| 2018/0268403 A1* | 9/2018 | Guglani | G06Q 20/3829 | |

FOREIGN PATENT DOCUMENTS

| | | | | |
|---|---|---|---|---|
| CN | 104182871 A | * | 12/2014 | ......... G06Q 20/4014 |
| CN | 104243484 A | | 12/2014 | |
| CN | 104484799 A | | 4/2015 | |
| CN | 104601327 A | | 5/2015 | |
| CN | 104618330 A | | 5/2015 | |
| CN | 104796258 A | | 7/2015 | |
| JP | 2010028753 A | | 2/2010 | |
| JP | 2013055488 A | | 3/2013 | |
| JP | 2014530433 A | | 11/2014 | |
| JP | 2015060262 A | | 3/2015 | |
| JP | 2015060262 A | * | 3/2015 | ............. G06Q 20/24 |
| JP | 2015511434 A | | 4/2015 | |
| KR | 20010073335 A | | 8/2001 | |
| KR | 20150002224 A | | 1/2015 | |

OTHER PUBLICATIONS

"Trusting mobile user devices and security modules", Feb. 1997; Andreas Pfitzman, Birgit Pfitzman, Matthias Schunter, Michael Waidner (Year: 1997).*

"Secure Quick Response-Payment (QR-Pay) System Using Mobile Device", Feb. 2011; Jaesik Lee, Chang-Hyun Cho, Moon-Seog Jun (Year: 2011).*

"Secure Mobile Payment Systems", May-Jun. 2014; Jesus Tellez Isaac, Sherali Zeadally (Year: 2014).*

CN104182871A_English Translation.pdf; Yiming, Zhong; (Year: 2014).*

JP2015060262_Machine Translation.pdf; Yoshihiro, Yano; (Year: 2015).*

Notice of Reasons for Refusal—JP2018505584-2019.pdf; Listed in Global Dossier of U.S. Appl. No. 15/685,279; (dated 2019).*

Tencent Technology, ISR, PCT/CN2016/082618, Aug. 4, 2016, 2 pgs.

Tencent Technology, Written Opinion, PCT/CN2016/082618, dated Aug. 4, 2016, 6 pgs.

Tencent Technology, IPRP, PCT/CN2016/082618, Aug. 4, 2016, 7 pgs.

* cited by examiner

METHOD, APPARATUS, AND SYSTEM FOR PROCESSING ORDER INFORMATION

RELATED APPLICATION

This application is a continuation-in-part of PCT/CN2016/082618, entitled "METHOD, APPARATUS AND SYSTEM FOR PROCESSING ORDER INFORMATION" filed on May 19, 2016, which claims priority to Chinese Patent Application No. 201510474158.7, filed with the State Intellectual Property Office of the People's Republic of China on Aug. 5, 2015, and entitled "METHOD, APPARATUS, AND SYSTEM FOR PROCESSING ORDER INFORMATION", both of which are incorporated herein by reference in their entirety.

FIELD OF THE TECHNOLOGY

Embodiments of the present invention relate to the field of computer technologies, and in particular, to a method, an apparatus, and a system for processing order information.

BACKGROUND OF THE DISCLOSURE

With the development of mobile terminal technologies, the application of mobile terminals becomes wider, and functions thereof also become stronger. Based on the internet, a user may select, by means of a mobile terminal, a commodity to be purchased and then pay for the commodity by means of the mobile terminal.

After the user selects the commodity to be purchased, the mobile terminal generates corresponding order information. The user may tap a corresponding payment option on the mobile terminal, and the mobile terminal may display a payment page. The user may enter information about a payment account, a payment password, or the like in the payment page and then tap a confirmation option. The mobile terminal then sends, to a payment server, the order information and the information about the payment account, the payment password, or the like entered by the user. The payment server performs payment processing.

During the implementation of the present disclosure, the inventor has found existence of at least the following problem:

A user needs to enter information about a payment account and a payment password and is then able to perform payment during a payment process, which results in low efficiency of order information processing.

SUMMARY

To overcome the problem in the related technology, embodiments of the present invention provide a method, an apparatus, and a system for processing order information. The technical solutions are as follows:

A first aspect provides a method for processing order information, including:

receiving, by means of a short-range communication component, order information sent by a first terminal, the order information including an account identifier of a paid object account and a payment amount;

acquiring an account identifier of a first account prestored at the second terminal and bound thereto as an account identifier of a payout account and adding the account identifier of the payout account to the order information;

performing encryption processing, by using a prestored first key, on the order information to which the account identifier of the payout account is added; and sending, by means of the short-range communication component, the encrypted order information to the first terminal.

A second aspect provides a method for processing order information, including:

receiving a payment instruction corresponding to a target order and sending, by means of a short-range communication component, order information of the target order to a second terminal, the order information including an account identifier of a paid object account and a payment amount;

receiving, by means of the short-range communication component, encrypted order information sent by the second terminal, the encrypted order information being obtained after the second terminal adds an account identifier of a payout account to the received order information and then performs encryption processing on the order information to which the account identifier of the payout account is added; and sending the encrypted order information to a server, so that the server performs payment processing according to the encrypted order information.

A third aspect provides a second terminal, including:

a receiving module, configured to receive, by means of a short-range communication component, order information sent by a first terminal, the order information including an account identifier of a paid object account and a payment amount;

an acquiring module, configured to acquire an account identifier of a first account prestored at the second terminal and bound thereto as an account identifier of a payout account and add the account identifier of the payout account to the order information;

an encryption module, configured to perform encryption processing, by using a prestored first key, on the order information to which the account identifier of the payout account is added; and a sending module, configured to send, by means of the short-range communication component, the encrypted order information to the first terminal.

A fourth aspect provides a first terminal, including:

a first sending module, configured to receive a payment instruction corresponding to a target order and send, by means of a short-range communication component, order information of the target order to a second terminal, the order information including an account identifier of a paid object account and a payment amount;

a receiving module, configured to receive, by means of the short-range communication component, encrypted order information sent by the second terminal, the encrypted order information being obtained after the second terminal adds an account identifier of a payout account to the received order information and then performs encryption processing on the order information to which the account identifier of the payout account is added; and a second sending module, configured to send the encrypted order information to a server, so that the server performs payment processing according to the encrypted order information.

A fifth aspect provides a second terminal, including:

one or more processors; and a memory, where the memory stores one or more programs, which are configured to be executed by the one or more processors, the one or more processors including instructions for performing the following operations:

receiving, by means of a short-range communication component, order information sent by a first terminal, the order information including an account identifier of a paid object account and a payment amount;

acquiring an account identifier of a first account prestored at the second terminal and bound thereto as an account identifier of a payout account and adding the account identifier of the payout account to the order information;

performing encryption processing, by using a prestored first key, on the order information to which the account identifier of the payout account is added; and sending, by means of the short-range communication component, the encrypted order information to the first terminal.

A sixth aspect provides a first terminal, including:

one or more processors; and a memory, where the memory stores one or more programs, which are configured to be executed by the one or more processors, the one or more processors including instructions for performing the following operations:

receiving a payment instruction corresponding to a target order and sending, by means of a short-range communication component, order information of the target order to a second terminal, the order information including an account identifier of a paid object account and a payment amount;

receiving, by means of the short-range communication component, encrypted order information sent by the second terminal, the encrypted order information being obtained after the second terminal adds an account identifier of a payout account to the received order information and then performs encryption processing on the order information to which the account identifier of the payout account is added; and sending the encrypted order information to a server, so that the server performs payment processing according to the encrypted order information.

A seventh aspect provides a system for processing order information, including a first terminal and a second terminal:

the second terminal being configured to: receive, by means of a short-range communication component, order information sent by the first terminal, the order information including an account identifier of a paid object account and a payment amount; acquire an account identifier of a first account prestored at the second terminal and bound thereto as an account identifier of a payout account and add the account identifier of the payout account to the order information; perform encryption processing, by using a prestored first key, on the order information to which the account identifier of the payout account is added; and send, by means of the short-range communication component, the encrypted order information to the first terminal; and the first terminal being configured to: receive a payment instruction corresponding to a target order; send, by means of a short-range communication component, order information of the target order to the second terminal; receive, by means of the short-range communication component, the encrypted order information sent by the second terminal and to which the account identifier of the payout account is added; and send the encrypted order information to a server, so that the server performs payment processing according to the encrypted order information.

The technical solutions provided by the embodiments of the present invention may include the following beneficial effects:

In the embodiments of the present invention, order information sent by a first terminal is received by means of a short-range communication component, the order information including an account identifier of a paid object account and a payment amount, an account identifier of a first account prestored at the second terminal and bound thereto is acquired as an account identifier of a payout account and the account identifier of the payout account is added to the order information, encryption processing is performed, by using a prestored first key, on the order information to which the account identifier of the payout account is added, and the encrypted order information is sent to the first terminal by means of the short-range communication component, so that the first terminal sends the encrypted order information to a server and the server performs payment processing according to the encrypted order information. In this way, a user can process the order information without entering information about a payment account, a payment password, or the like. Therefore the efficiency of order information processing can be improved.

It should be understood that the foregoing general description and detailed description in the following are used for merely exemplary and interpretive, but cannot constitute a limitation to the embodiments of the present invention.

BRIEF DESCRIPTION OF THE DRAWINGS

The accompanying drawings, which are incorporated herein and form a part of the specification, illustrate embodiments in accordance with the present invention, and together with the specification, serve to explain the principles of the present disclosure. In the accompanying drawings.

The foregoing accompanying drawings illustrate specific embodiments of the present invention, and more detailed description is provided below. The accompanying drawings and literal description are not intended to limit the scope of the concept of the embodiments of the present invention, but to explain the concept of the embodiments of the present invention to a person skilled in the art with reference to the specific embodiments.

DESCRIPTION OF EMBODIMENTS

The exemplary embodiments are described in detail herein, and instances thereof are shown in the accompanying drawings. In terms of the accompanying drawings involved in the following description, unless otherwise specified, the same number in different accompanying drawings indicates the same or similar elements. The implementation manners described in the exemplary embodiments do not indicate all implementation manners consistent with the embodiments of the present invention. On the contrary, the implementation manners are only examples of apparatuses and methods that are consistent with some aspects of the embodiments of the present invention and that are described in detail in the appended claims.

Embodiment 1

Figure 1:
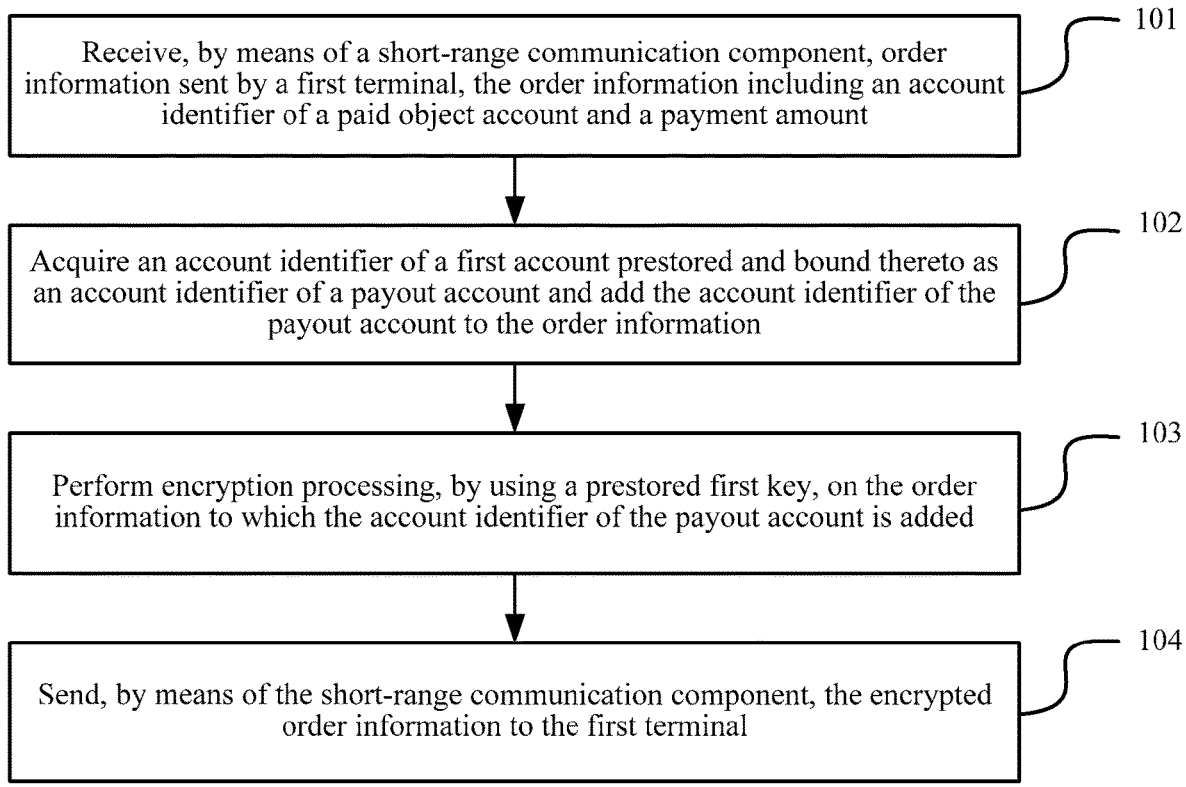
FIG. 1 is a flowchart of a method for processing order information according to an exemplary embodiment.

Embodiments of the present invention provide a method for processing order information. As shown in FIG. 1, the method may be implemented by a first terminal and a second terminal together. The first terminal may be a mobile terminal such as a mobile phone or a tablet computer, and the second terminal may be a wearable smart device such as a smart bracelet. The first terminal and the second terminal are each provided with a short-range communication component, and the first terminal and the second terminal may transmit data by means of the short-range communication components.

As shown in FIG. 1, the processing procedure of the second terminal in the method may include the following steps:

Step 101: Receive, by means of a short-range communication component, order information sent by a first terminal, the order information including an account identifier of a paid object account and a payment amount.

Step 102: Acquire an account identifier of a first account prestored at the second terminal and bound thereto as an account identifier of a payout account and add the account identifier of the payout account to the order information.

Step 103: Perform encryption processing, by using a prestored first key, on the order information to which the account identifier of the payout account is added.

Step 104: Send, by means of the short-range communication component, the encrypted order information to the first terminal.

Figure 2:
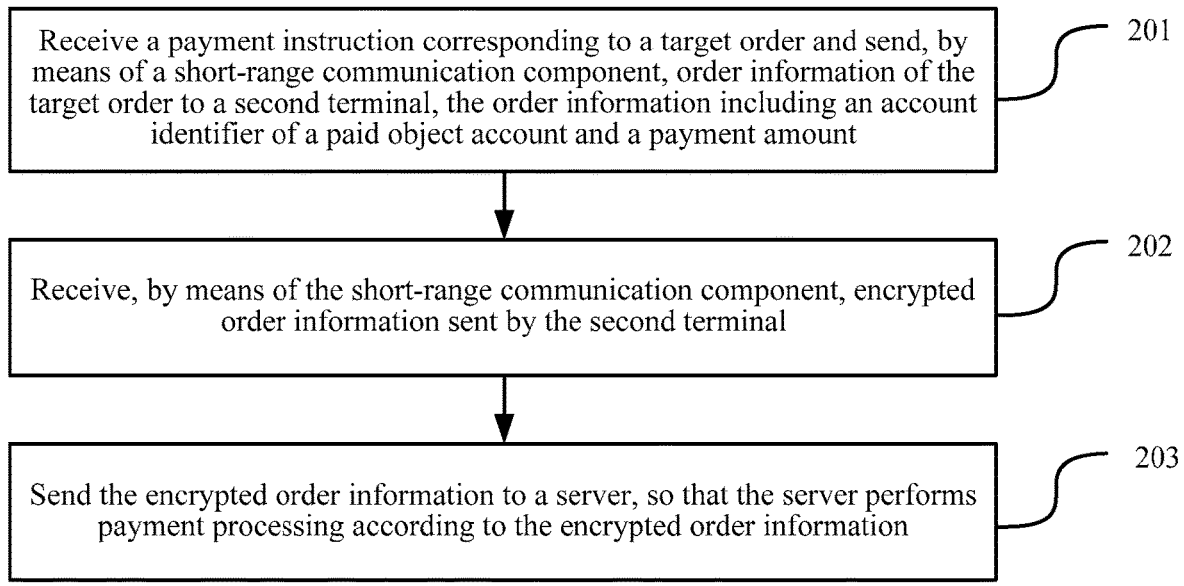
FIG. 2 is a flowchart of a method for processing order information according to an exemplary embodiment.

As shown in FIG. 2, the processing procedure of the first terminal in the method may include the following steps:

Step 201: Receive a payment instruction corresponding to a target order and send, by means of a short-range communication component, order information of the target order to a second terminal, the order information including an account identifier of a paid object account and a payment amount.

Step 202: Receive, by means of the short-range communication component, encrypted order information sent by the second terminal, the encrypted order information being obtained after the second terminal adds an account identifier of a payout account to the received order information and then performs encryption processing on the order information to which the account identifier of the payout account is added.

Step 203: Send the encrypted order information to a server, so that the server performs payment processing according to the encrypted order information.

In the embodiments of the present invention, order information sent by a first terminal is received by means of a short-range communication component, the order information including an account identifier of a paid object account and a payment amount, an account identifier of a first account prestored at the second terminal and bound thereto is acquired as an account identifier of a payout account and the account identifier of the payout account is added to the order information, encryption processing is performed, by using a prestored first key, on the order information to which the account identifier of the payout account is added, and the encrypted order information is sent to the first terminal by means of the short-range communication component, so that the first terminal sends the encrypted order information to a server and the server performs payment processing according to the encrypted order information. In this way, a user can process the order information without entering information about a payment account, a payment password, or the like. Therefore the efficiency of order information processing can be improved.

Embodiment 2

Figure 4:
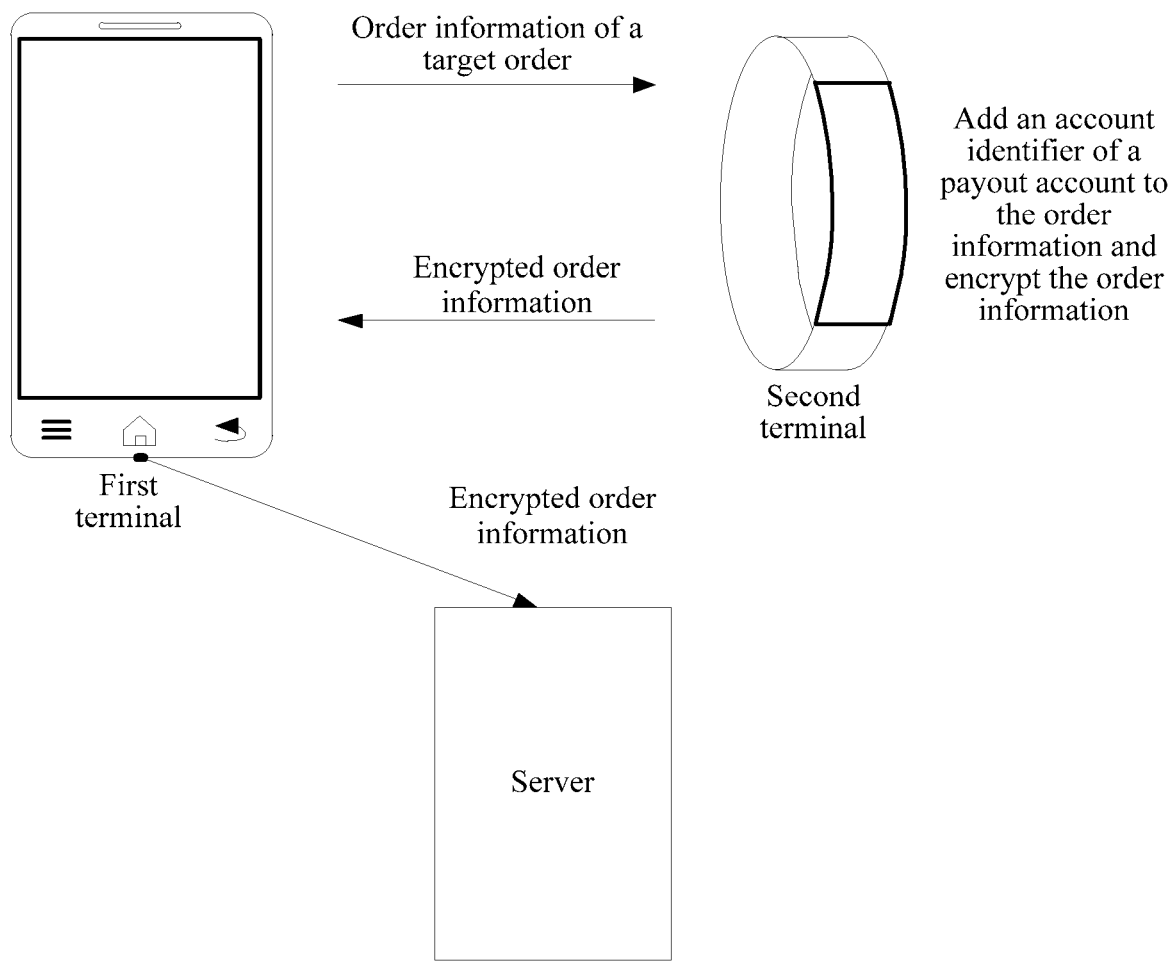
FIG. 4 is a block diagram of a system according to an exemplary embodiment.

Embodiments of the present invention provide a method for processing order information. The method may be implemented by a first terminal, a second terminal, and a server together. The first terminal may be a mobile terminal such as a mobile phone or a tablet computer, and the second terminal may be a wearable smart device such as a smart bracelet. The first terminal may include a short-range communication component. The short-range communication component may be a near field communication (NFC) component or a Bluetooth component, configured to transmit data with the second terminal. The first terminal may include an input unit, which may be a key, a touchscreen, or a mouse, and a user may select, by means of the input unit, a commodity to be purchased and pay for it on the first terminal. The first terminal may include a processor. The processor may be configured to generate order information and send received encrypted order information to a server. The first terminal may further include components such as a memory, a sensor, and a power supply. The second terminal may be a portable smart device such as smart bracelet. The second terminal may include a short-range communication component. The short-range communication component may be an NFC component or Bluetooth component, configured to transmit data with the first terminal. The second terminal may include an input unit, which may be a key or a touchscreen, and a user may confirm payment for a target order on the second terminal by means of the input unit. The second terminal may include a processor. The processor may be configured to encrypt received order information. The second terminal may further include components such as a memory, a sensor, and a power supply. As shown in FIG. 4, FIG. 4 is a block diagram of a system according to an embodiment of the present invention. The system includes a first terminal, a second terminal, and a server.

Figure 3:
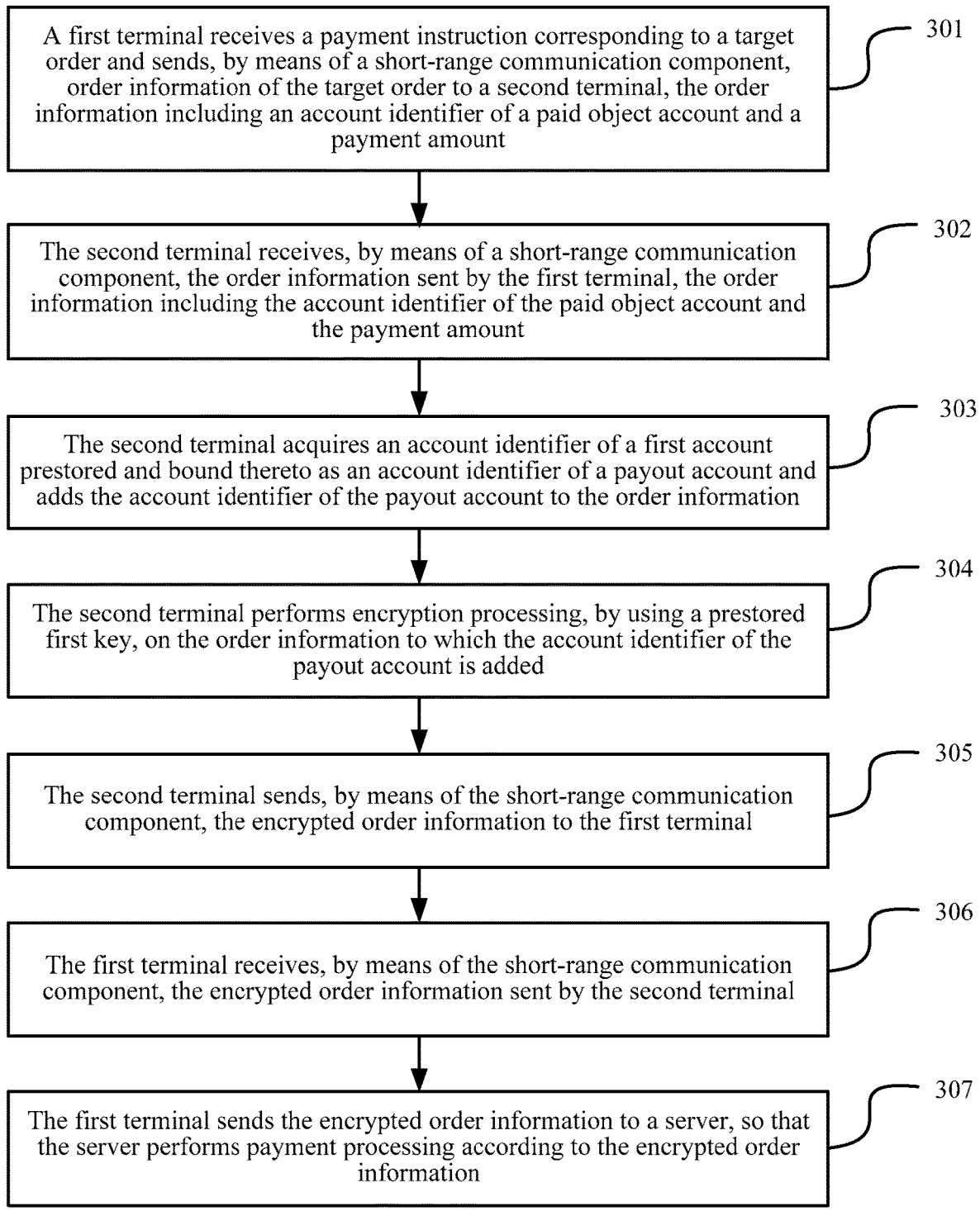
FIG. 3 is a flowchart of a method for processing order information according to an exemplary embodiment.

The processing procedure shown in FIG. 3 is described in detail below in combination with the implementation manners, and the content may be as follows:

Step 301: A first terminal receives a payment instruction corresponding to a target order and sends, by means of a short-range communication component, order information of the target order to a second terminal, the order information including an account identifier of a paid object account and a payment amount.

During implementation, the first terminal and the second terminal may each be provided with a short-range communication component. The short-range communication component may be an NFC component, a Bluetooth component, or the like. The first terminal and the second terminal may transmit information by means of the short-range communication components. The first terminal may establish a binding relationship with the second terminal. There may be various methods for establishing the binding relationship. Embodiments of the present invention provide a feasible method, specifically:

A user may install an application having a binding function (which may be referred to as a first application) in the first terminal. The user may open the first application and log in an account and password of the first application. The first application may be an application for paying, or may also be an instant messaging application. The user may perform payment by using the account of the first application. The user may tap an option of binding another terminal in the first application. The first terminal may receive a tap instruction corresponding to the option, and then may enable local Bluetooth to further detect another terminal near the Bluetooth, acquire an identifier of the terminal, and display a list of identifiers of terminals. The user may select, from the list of identifiers, an identifier of a terminal to be bound (that is, the identifier of the second terminal), and the first terminal may send a binding request to the second terminal. After receiving the binding request, the second terminal may display prompt information of whether to perform binding. The user may tap an option of confirming binding in the second terminal, and the second terminal may send reply information of confirming binding to the first terminal, so that a binding relationship is established between the second terminal and the first terminal. After the binding relationship is established between the second terminal and the first terminal, the first terminal may send, by means of the short-range communication component, an account identifier of an account that is locally logged in the first application (that is, the account identifier of the first account) to the second terminal. After receiving the account identifier of the first account, the second terminal may store the account identifier of the first account.

The first terminal may also be installed with an application used for purchasing a commodity (which may be referred to as a second application). The second application may be the same as or different from the first application, which is not limited in this embodiment. The user may browse commodity information of various commodities in the second application, select a commodity to be purchased, and then tap an option of determining to purchase. The terminal may receive a tap instruction corresponding to an order of the order, and then generate corresponding order information (that is, the order information of the target order). The order information may include information such as commodity information of a commodity that the user wants to purchase (for example, a name, a model, and a quantity of the commodity), account information of a seller account (that is, the account identifier of the paid object account), and payment amount. For example, the order information may be: mobile phone A, quantity 1, seller ID of 38624, and amount of 5000.

Figure 5:
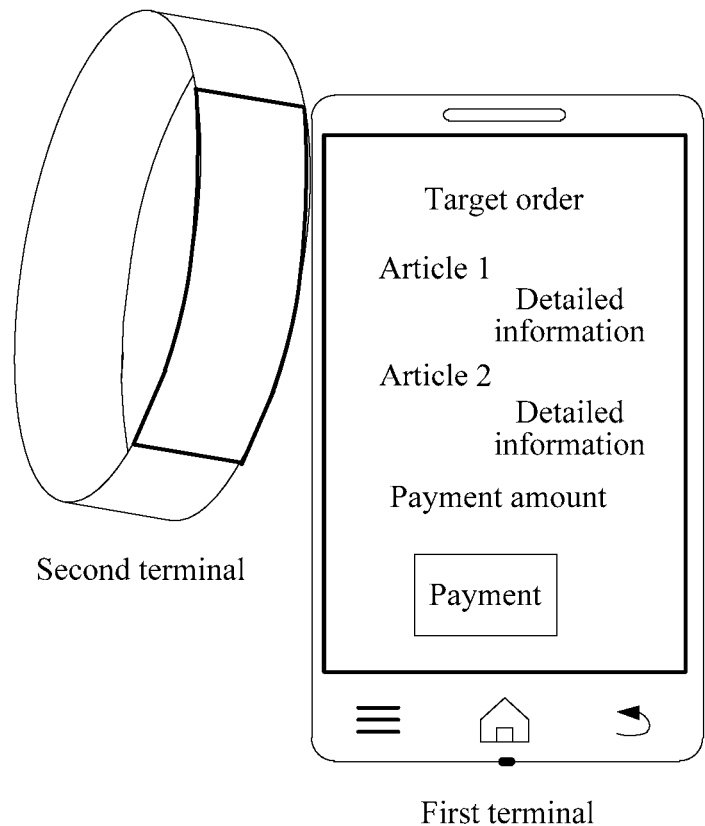
FIG. 5 is a schematic diagram of an application scenario according to an exemplary embodiment.

The user may tap a payment option corresponding to the target order. The first terminal may receive a payment instruction corresponding to the target order and then send, by means of the short-range communication component, the order information of the target order to the second terminal. In a situation in which the short-range communication component is a Bluetooth component, the user needs to place the first terminal and the second terminal at a distance equal to or less than a threshold distance for Bluetooth transmission. In a situation in which the short-range communication component is an NFC component, after tapping the payment option, the user may contact or approach the first terminal by using the second terminal, as shown in FIG. 5, so that the first terminal may send the order information of the target order to the second terminal. The first terminal may be a mobile terminal such as a mobile phone or a tablet computer, or may also be a point of sales (POS) machine. In a situation in which the first terminal is a POS machine, the account identifier of the paid object account in the order information may be an identifier of the POS machine, the payment amount may be manually entered by a seller, and a corresponding application scenario is that the second terminal performs payment as a bus card, a meal card, an e-wallet, or the like. In addition, after the user taps the payment option corresponding to the target order, the first terminal may display a corresponding prompt image according to the short-range communication component currently enabled, for example, the first terminal may display a dynamic image indicating that a smart bracelet and a mobile phone are placed at a distance less than the threshold distance for Bluetooth transmission when the short-range communication component currently enabled is a Bluetooth component, or may display a dynamic image indicating contact between a smart bracelet and a mobile phone when the short-range communication component currently enabled is an NFC component.

Optionally, the order information may further include a generation time of the target order, so that a server may determine whether there is order information having the same account identifier of the paid object account, the same account identifier of the payout account, the same payment amount, and the same generation time of the target order as those included in the received order information in processed order information when receiving encrypted order information, discard the received order information if the order information exists, and perform payment processing according to the received order information if the order information does not exist. The specific processing procedure of the server is described in detail subsequently.

Optionally, the first terminal may send a hash value of the order information to the second terminal, so as to reduce transmitted data volume. The corresponding processing process may be as follows: calculating a hash value of the order information of the target order; and sending, by means of the short-range communication component, the order information of the target order to the second terminal, the order information including the account identifier of the paid object account, the payment amount, and the hash value of the order information of the target order.

During implementation, after receiving the payment instruction corresponding to the target order, the first terminal may calculate a hash value of the order information of the target order according to a prestored hash algorithm and then add the hash value to the order information. Meanwhile, the first terminal may delete other information except for the account identifier of the paid object account and the payment amount from the order information, and further send, by means of the short-range communication component, the order information of the target order to the second terminal. The order information may include the account identifier of the paid object account, the payment amount, and the hash value of the order information of the target order. In this way, the data volume of data transmitted from the first terminal to the second terminal may be reduced, so that efficiency of transmission between the first terminal and the second terminal can be improved.

Optionally, the short-range communication component may be enabled after the user selects to perform identity verification by means of the second terminal. The corresponding processing process may be as follows: displaying an identity verification form selection interface, the identity verification form selection interface displaying at least a first identity verification form, and the first identity verification form being a form for identity verification by means of the second terminal; and enabling the short-range communication component when receiving a selection instruction corresponding to the first identity verification form.

During implementation, after receiving the payment instruction corresponding to the target order, the first terminal may display an identity verification form selection interface, the identity verification form selection interface displaying at least a first identity verification form, where the first identity verification form may be a form for identity verification by means of the second terminal. The user may tap an option corresponding to the first identity verification form in the identity verification form selection interface. The first terminal may receive a selection instruction corresponding to the first identity verification form, and then enable the short-range communication component, so as to send, by means of the short-range communication component, the order information of the target order to the second terminal. In this way, the short-range communication component may not be enabled if use of the short-range communication component is not needed, and therefore power consumption of the first terminal can be reduced.

Step 302: The second terminal receives, by means of a short-range communication component, the order information sent by the first terminal, the order information including the account identifier of the paid object account and the payment amount.

During implementation, after the first terminal sends, by means of the short-range communication component, the order information of the target order to the second terminal, the second terminal may receive the order information, then parse the order information, and acquire information such as commodity information of a commodity that the user wants to purchase, the account identifier of the paid object account, and the payment amount.

Optionally, in a situation in which the first terminal sends the hash value of the order information to the second terminal, correspondingly, the processing process of step 302 may be as follows: receiving, by means of the short-range communication component, the order information sent by the first terminal, the order information including the account identifier of the paid object account, the payment amount, and the hash value of the order information of the target order.

During implementation, after the first terminal sends, by means of the short-range communication component, the order information of the target order to the second terminal, the second terminal may receive the order information, then parse the order information, and acquire information such as the hash value of the order information, the account identifier of the paid object account, and the payment amount of the target order.

Optionally, the user may enable the short-range communication component, so that the second terminal may receive, by means of the short-range communication component, the order information sent by the first terminal. The corresponding processing process may be as follows: receiving an enable instruction corresponding to the short-range communication component and enabling the short-range communication component.

During implementation, an enable key for the short-range communication component may be disposed in the second terminal. The enable key may be a mechanical key or may also be a touch key. The user may press or touch the enable key, and the second terminal may receive an enable instruction corresponding to the short-range communication component and then enable the short-range communication component. After pressing or touching the enable key, the user may contact or approach the first terminal by using the second terminal. In this way, the second terminal may receive, by means of the short-range communication component, the order information sent by the first terminal.

Step 303: The second terminal acquires an account identifier of a first account prestored at the second terminal and bound thereto as an account identifier of a payout account and adds the account identifier of the payout account to the order information.

During implementation, after receiving the order information sent by the first terminal, the second terminal may acquire an account identifier of a first account prestored at the second terminal and bound thereto as an account identifier of a payout account and then add the account identifier of the payout account to the order information.

Optionally, the user may first perform confirmation on the second terminal, and then the second terminal performs the foregoing processing. Correspondingly, the processing process of step 303 may be as follows: displaying the order information of the target order and a payment confirmation option corresponding to the target order; and acquiring the account identifier of the first account prestored at the second terminal and bound thereto as the account identifier of the payout account and adding the account identifier of the payout account to the order information when a tap instruction corresponding to the payment confirmation option is received.

Figure 6:
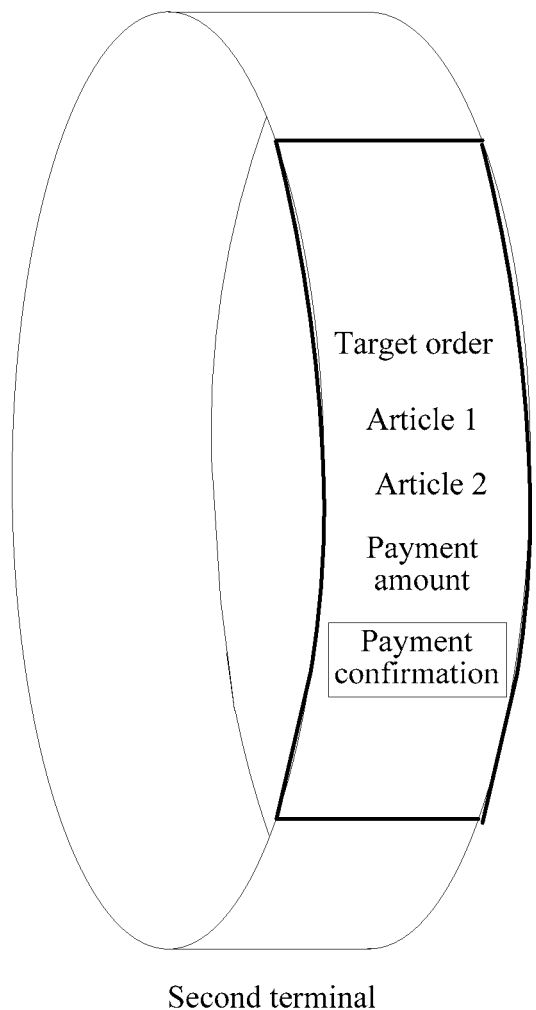
FIG. 6 is a schematic diagram of interface display according to an exemplary embodiment.

During implementation, after receiving the order information sent by the first terminal, the second terminal may display the order information of the target order. For example, the second terminal may display one or more pieces of information of commodity information of a commodity, the account identifier of the paid object account, or the payment amount in the order information, or may also display the payment confirmation option corresponding to the target order, as shown in FIG. 6. The user may check the order information and tap the payment confirmation option after confirming. The second terminal may receive a tap instruction corresponding to the payment confirmation option, then acquire the account identifier of the first account prestored at the second terminal and bound thereto as the account identifier of the payout account, and add the account identifier of the payout account to the order information. In addition, after receiving the order information sent by the first terminal, the second terminal may send prompt information. For example, the second terminal may send a preset audio or vibrates to prompt a user, so that the user may learn about that the second terminal has received the order information sent by the first terminal. In addition, in the foregoing situation in which the first terminal may send the hash value of the order information to the second terminal, the second terminal may display merely the account identifier of the paid object account and the payment amount, and does not need to display the hash value of the order information of the target order.

Optionally, the second terminal may display the order information of the target order after the user has successfully unlocked the second terminal. The corresponding processing process may be as follows: displaying the order information of the target order and the payment confirmation option corresponding to the target order when changing from a locked state to an unlocked state.

During implementation, the user may preset unlocking information in the second terminal. The unlocking information may be information such as an unlocking password, an unlocking pattern, or a fingerprint entered by the user. The user may first unlock the second terminal, that is, enter the unlocking information, when needing to use the second terminal. For example, the user may touch a fingerprint detection area of the second terminal by using a finger, or may enter an unlocking password or an unlocking pattern in the terminal. The second terminal may match the unlocking information entered by the user and prestored unlocking information, determine that unlocking by the user succeeds if the matched result is consistent, and change the current status from a locked state to an unlocked state. The second terminal may then display the order information of the target order and the payment confirmation option corresponding to the target order. In addition, there are various unlocking methods that can be applied to the second terminal. In addition to the foregoing unlocking by using information such as an unlocking password, an unlocking pattern, or a fingerprint, an unlocking key configured to unlock may also be disposed on the second terminal, and a user may unlock the second terminal by triggering the unlocking key. Meanwhile, the foregoing methods can be used in combination.

Step 304: The second terminal performs encryption processing, by using a prestored first key, on the order information to which the account identifier of the payout account is added.

During implementation, a key used for encryption (that is, the first key) may be stored in the second terminal in advance. The first key may be a private key provided by the server. After adding the account identifier of the payout account to the order information, the second terminal may perform encryption processing, by using the prestored first key, on the order information to which the account identifier of the payout account is added.

Step 305: The second terminal sends, by means of the short-range communication component, the encrypted order information to the first terminal.

During implementation, after encrypting the order information to which the account identifier of the payout account is added, the second terminal may send, by means of the short-range communication component, the encrypted order information to the first terminal. In a situation in which the short-range communication component is a Bluetooth component, the user needs to place the first terminal and the second terminal at a distance equal to or less than a threshold distance for Bluetooth transmission. In a situation in which the short-range communication component is an NFC component, after tapping the payment option, the user may contact or approach the first terminal by using the second terminal, so that the second terminal may send the encrypted order information to the first terminal. Similarly, after the second terminal performs encryption processing, the second terminal may display a corresponding prompt image according to the short-range communication component currently enabled, for example, the second terminal may display a dynamic image indicating that a smart bracelet and a mobile phone are placed at a distance less than the threshold distance for Bluetooth transmission when the short-range communication component currently enabled is a Bluetooth component, or may display a dynamic image indicating contact between a smart bracelet and a mobile phone when the short-range communication component currently enabled is an NFC component.

Optionally, the second terminal may also send unencrypted order information to the first terminal. Correspondingly, the processing process of step 305 may be as follows: sending, by means of the short-range communication component, the unencrypted order information and encrypted order information to which the account identifier of the payout account is added to the first terminal.

During implementation, the second terminal may store the order information to which the account identifier of the payout account is added. After encrypting the order information to which the account identifier of the payout account is added, the second terminal may acquire the order information to which the account identifier of the payout account is added and the encrypted order information to which the account identifier of the payout account is added, and then send the order information to which the account identifier of the payout account is added and the encrypted order information to which the account identifier of the payout account is added to the first terminal.

Optionally, the second terminal may automatically disable the short-range communication component to reduce power consumption. The corresponding processing process may as follows: disabling the short-range communication component if no other order information sent by the first terminal is received within a preset period of time.

During implementation, timing may start after the second terminal sends, by means of the short-range communication component, the encrypted order information to the first terminal. If the second terminal does not receive other order information sent by the first terminal when the preset period of time is reached, the second terminal may disable the short-range communication component. In addition the second terminal may display, after the second terminal disables the short-range communication component, prompt information indicating that the short-range communication component is disabled.

Step 306: The first terminal receives, by means of the short-range communication component, the encrypted order information sent by the second terminal.

During implementation, after the second terminal sends the encrypted order information to the first terminal, the first terminal may receive, by means of the short-range communication component, the encrypted order information sent by the second terminal and to which the account identifier of the payout account is added.

Optionally, in the foregoing situation in which the second terminal sends the unencrypted order information to the first terminal, the corresponding processing process of step 306 may be as follows: the first terminal receives, by means of the short-range communication component, the unencrypted order information and encrypted order information sent by the second terminal and to which the account identifier of the payout account is added.

Optionally, the first terminal may automatically disable the short-range communication component to reduce power consumption. The corresponding processing process may as follows: disabling the short-range communication component if no payment instruction corresponding to another order is received within a preset period of time.

During implementation, timing may start after the first terminal receives, by means of the short-range communication component, the encrypted order information sent by the second terminal. If the first terminal does not receive a payment instruction corresponding to another order when the preset period of time is reached, the first terminal may disable the short-range communication component. In addition the first terminal may display, after the first terminal disables the short-range communication component, prompt information indicating that the short-range communication component is disabled. It should be noted that the preset period of time in the first terminal may be the same as or different from the preset period of time in the second terminal.

Step 307: The first terminal sends the encrypted order information to a server, so that the server performs payment processing according to the encrypted order information.

During implementation, after receiving the encrypted order information to which the account identifier of the payout account is added, the first terminal may send the encrypted order information to which the account identifier of the payout account is added to the server. The server may be one server, or may also be a server cluster consisting of a plurality of servers. In this embodiment, the server being a server cluster consisting of a plurality of servers is used as an example. The situation in which the server is one server is similar to the example, and is not further described herein. The server cluster may include a digital signature server, a payment server, and a bank server. After completing payment processing, the server may send a payment successful message to the first terminal. After receiving the payment successful message, the first terminal may display payment successful prompt information, so as to notify the user of the successful payment.

The first terminal may send the encrypted order information to which the account identifier of the payout account is added to the digital signature server. The digital signature server may perform decryption processing, by using a locally prestored public key, on the received encrypted order information, determine that the order information is valid if the decryption succeeds, and then send the decrypted order information to the payment server. The payment server may acquire the account identifier of the payout account, the account identifier of the paid object account, and the payment amount in the order information, then deduct the payment amount from the money of the payout account and add the payment amount to the paid object account. In a situation in which no money is stored in the payout account, the payment server may send, based on interface information provided by the bank server, information such as the order information and hash-based message authentication code (HMAC) to the bank server. The bank server may determine, according to the account identifier of the payout account in the order information, a bank card number bound to the payout account, and transfer the corresponding amount from an account corresponding to the bank card number to the payment server according to the payment amount in the order information. Then, the payment server adds the payment amount to the paid object account.

Optionally, in the foregoing situation in which the second terminal sends the unencrypted order information to the first terminal, correspondingly, the processing process of step 307 may be as follows: sending the unencrypted order information and encrypted order information to which the account identifier of the payout account is added to the server, so that the server performs validity verification on decrypted order information according to the unencrypted order information and the encrypted order information, and performs payment processing according to the unencrypted order information and the encrypted order information if the verification succeeds.

During implementation, after receiving the unencrypted order information and encrypted order information sent by the second terminal and to which the account identifier of the payout account is added, the first terminal may forward the received information to the payment server. After receiving the unencrypted order information and encrypted order information to which the account identifier of the payout account is added, the payment server may store the information and forward the information to the digital signature server. After receiving the unencrypted order information and the encrypted order information that are sent by the payment server, the digital signature server may decrypt the encrypted order information by using the locally prestored public key and compare the decrypted result and the unencrypted order information. If the content included in the decrypted result is fully the same as that in the unencrypted order information, the digital signature server may send a verification successful message to the payment server. After receiving the verification successful message, the payment server may perform payment processing according to the foregoing method. If the content included in the decrypted result is not the same as from that in the unencrypted order information, the digital signature server may send a verification failure message to the payment server. After receiving the verification failure message, the payment server may not perform payment processing on the order information.

Optionally, in the foregoing situation in which the order information includes the account identifier of the paid object account, the payment amount, and the hash value of the order information of the target order, correspondingly, the processing process of step 307 may be as follows: sending the order information that is encrypted and includes the hash value to the server, so that the server performs validity verification on the order information according to the encrypted hash value, and performs payment processing according to the encrypted order information if the verification succeeds.

During implementation, the second terminal may send the order information that is encrypted and includes the hash value to the first terminal. The order information includes information such as the hash value of the order information, the account identifier of the paid object account, the account identifier of the payout account, and the payment amount, which may be referred to as key order information. The first terminal may also acquire the order information on which hash calculation is not performed, that is, the order information including information such as commodity information of a commodity that the user wants to purchase (for example, a name, a model, and a quantity of the commodity), account information of a seller account (that is, the account identifier of the paid object account), and payment amount, which may be referred as complete order information. The hash value in the key order information is a hash value obtained after performing hash calculation on the complete order information. The first terminal may send the encrypted key order information and the complete order information to the payment server. The payment server may forward the information to the digital signature server. The digital signature server may prestore a hash algorithm that is the same as that in the first terminal. After receiving the encrypted key order information and the complete order information, the digital signature server may perform decryption processing on the encrypted key order information by using the locally prestored public key to obtain the hash value of the order information, then perform hash calculation on the complete order information by using the locally stored hash algorithm to obtain a hash value of the complete order information, and then compare the hash value obtained after decryption and the hash value obtained through calculation. If the hash value obtained after decryption and the hash value obtained through calculation are the same, the digital signature server may determine that the order information verification succeeds, and then sends a verification successful message to the payment server, so that the payment server performs payment processing. If the hash value obtained after decryption and the hash value obtained through calculation are not the same, the digital signature server may send a verification failure message to the payment server. After receiving the verification failure message, the payment server may not perform payment processing on the order information.

In addition, in the foregoing situation in which the order information includes the generation time of the target order, correspondingly, the processing process of step 307 may be as follows: after receiving the order information sent by the second terminal and to which the account identifier of the payout account is added and the encrypted order information sent by the second terminal and to which the account identifier of the payout account is added, the first terminal may forward the received information to the payment server; and after receiving the order information to which the account identifier of the payout account is added and the encrypted order information to which the account identifier of the payout account is added, the payment server may store the information and forward the information to the digital signature server. The digital signature server may store the account identifier of the paid object account, the account identifier of the payout account, the payment amount, and the generation time of the target order of the processed order information. After receiving the order information sent by the payment server and to which the account identifier of the payout account is added and the encrypted order information sent by the server and to which the account identifier of the payout account is added, the digital signature server may decrypt the encrypted order information by using the locally prestored public key and compare the decrypted result and the order information to which the account identifier of the payout account is added. If the content in the decrypted result is fully the same as that in the order information to which the account identifier of the payout account is added, the digital signature server may perform further determining. The terminal may search the processed order information for determining whether there is order information having the same account identifier of the paid object account, the same account identifier of the payout account, the same payment amount, and the same generation time of the target order as those included in the received order information in processed order information, discard the received order information and send a verification failure message to the payment server if the order information exists, and send a verification successful message to the payment server, so that the payment server performs payment processing if the order information does not exist. In addition, if the content in the decrypted result is not the same as that in the order information to which the account identifier of the payout account is added, the digital signature server may send a verification failure message to the payment server. After receiving the verification failure message, the payment server may not perform payment processing on the order information.

For example, in the received order information, the account identifier of the paid object account is A, the account identifier of the payout account is B, the payment amount is 100 yuan, and the generation time of the target order is 17:45, May 16, 2015. If the digital signature server finds, in the processed order information, order information of which the account identifier of the paid object account is A, the account identifier of the payout account is B, the payment amount is 100 yuan, and the generation time of the target order is 17:45, May 16, 2015, it indicates that the order information has been processed, and the digital signature server may discard the received order information and send a verification failure message to the payment server, so as to avoid repeated processing of the order and prevent from deducting extra money from the payment account. If the digital signature server has not found the order information, it indicates that the order information is not processed, and the digital signature server may send a verification successful message to the payment server, so that the payment server processes the order information.

Optionally, the first terminal may perform secondary encryption on the order information. Correspondingly, the processing process of step 307 may be as follows: performing secondary encryption processing on the encrypted order information by using a prestored second key, sending the order information that is encrypted twice to the server, so that the server performs payment processing according to the order information that is encrypted twice.

During implementation, after receiving the encrypted order information sent by the second terminal and to which the account identifier of the payout account is added, the first terminal may perform secondary encryption processing on the encrypted order information by using a prestored second key and then send the order information that is encrypted twice to the payment server. The payment server may decrypt, by using a prestored third key, the received order information that is encrypted twice and then send the decrypted order information to the digital signature server. The digital signature server may then decrypt the received order information by using the prestored public key and then perform the verification processing, so as to perform payment processing on the order information.

In addition, in the processing process, the first key stored in the second terminal and the public key in the digital signature server are generated by the digital signature server. In practice, an application used for generating a key pair may also be configured in the second terminal. The second terminal generates a key pair, and then the first terminal sends the public key to the payment server. The first terminal may send merely the public key to the payment server, or may also send the public key and the encrypted order information together to the payment server. After receiving the encrypted order information, the payment server may verify the encrypted order information by using the received public key. If the verification succeeds, the payment server may perform payment processing on the order information. If the verification fails, the payment server discards the order information.

In the embodiments of the present invention, order information sent by a first terminal is received by means of a short-range communication component, the order information including an account identifier of a paid object account and a payment amount, an account identifier of a first account prestored at the second terminal and bound thereto is acquired as an account identifier of a payout account and the account identifier of the payout account is added to the order information, encryption processing is performed, by using a prestored first key, on the order information to which the account identifier of the payout account is added, and the encrypted order information is sent to the first terminal by means of the short-range communication component, so that the first terminal sends the encrypted order information to a server and the server performs payment processing according to the encrypted order information. In this way, a user can process the order information without entering information about a payment account, a payment password, or the like. Therefore the efficiency of order information processing can be improved.

Embodiment 3

Figure 7:
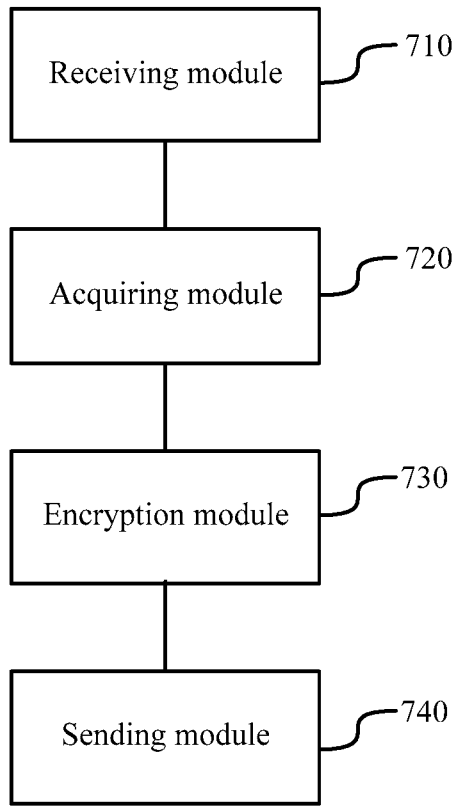
FIG. 7 is a schematic structural diagram of a second terminal according to an exemplary embodiment.

Based on the same technical concept, embodiments of the present invention further provide a second terminal. As shown in FIG. 7, the second terminal includes:

a receiving module 710, configured to receive, by means of a short-range communication component, order information sent by a first terminal, the order information including an account identifier of a paid object account and a payment amount;

an acquiring module 720, configured to acquire an account identifier of a first account prestored at the second terminal and bound thereto as an account identifier of a payout account and add the account identifier of the payout account to the order information;

an encryption module 730, configured to perform encryption processing, by using a prestored first key, on the order information to which the account identifier of the payout account is added; and a sending module 740, configured to send, by means of the short-range communication component, the encrypted order information to the first terminal.

Optionally, the sending module 740 is configured to:

send, by means of the short-range communication component, unencrypted order information and encrypted order information to which the account identifier of the payout account is added to the first terminal.

Optionally, the acquiring module 720 is configured to:

display the order information of the target order and a payment confirmation option corresponding to the target order; and acquire an account identifier of a first account prestored at the second terminal and bound thereto as an account identifier of a payout account and add the account identifier of the payout account to the order information when receiving a tap instruction corresponding to the payment confirmation option.

Optionally, the acquiring module 720 is configured to:

display the order information of the target order and the payment confirmation option corresponding to the target order when changing from a locked state to an unlocked state.

Optionally, the receiving module 710 is configured to:

receive, by means of the short-range communication component, the order information sent by the first terminal, the order information including the account identifier of the paid object account, the payment amount, and a hash value of the order information of the target order.

Optionally, the receiving module 710 is further configured to:

receive an enable instruction corresponding to the short-range communication component and enable the short-range communication component.

Optionally, the second terminal further includes:

a disable module, configured to disable the short-range communication component if no other order information sent by the first terminal is received within a preset period of time.

Figure 8:
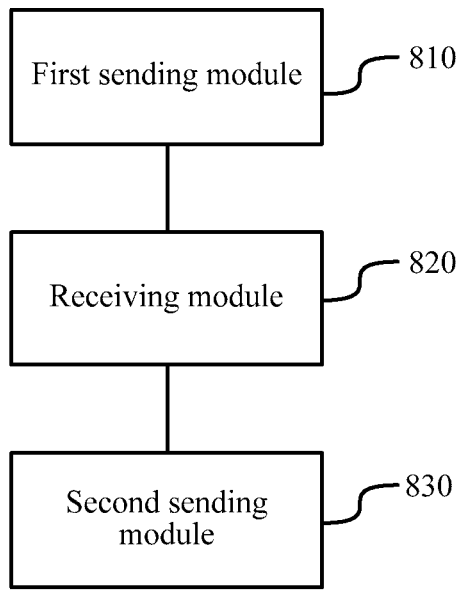
FIG. 8 is a schematic structural diagram of a first terminal according to an exemplary embodiment.

Based on the same technical concept, embodiments of the present invention further provide a first terminal. As shown in FIG. 8, the first terminal includes:

a first sending module 810, configured to receive a payment instruction corresponding to a target order and send, by means of a short-range communication component, order information of the target order to a second terminal, the order information including an account identifier of a paid object account and a payment amount;

a receiving module 820, configured to receive, by means of the short-range communication component, encrypted order information sent by the second terminal, the encrypted order information being obtained after the second terminal adds an account identifier of a payout account to the received order information and then performs encryption processing on the order information to which the account identifier of the payout account is added; and a second sending module 830, configured to send the encrypted order information to a server, so that the server performs payment processing according to the encrypted order information.

Optionally, the order information includes a generation time of the target order, so that the server determines, when receiving the encrypted order information, whether there is order information having the same account identifier of the paid object account, the same account identifier of the payout account, the same payment amount, and the same generation time of the target order as those included in the received order information in processed order information, discards the received order information if the order information exists, and performs payment processing according to the received order information if the order information does not exist.

Optionally, the second sending module 830 is configured to:

perform secondary encryption processing, by using a prestored second key, on the encrypted order information and send the order information that is encrypted twice to the server, so that the server performs payment processing according to the order information that is encrypted twice.

Optionally, the receiving module 820 is configured to:

receive, by means of the short-range communication component, unencrypted order information and encrypted order information sent by the second terminal and to which the account identifier of the payout account is added; and the second sending module 830 is configured to:

send the unencrypted order information and encrypted order information to which the account identifier of the payout account is added to the server, so that the server performs validity verification on decrypted order information according to the unencrypted order information and the encrypted order information, and performs payment processing according to the unencrypted order information and the encrypted order information if the verification succeeds.

Optionally, the first sending module 810 is configured to:

calculate a hash value of the order information of the target order;

send, by means of the short-range communication component, the order information of the target order to the second terminal, the order information including the account identifier of the paid object account, the payment amount, and the hash value of the order information of the target order; and the second sending module 830 is configured to:

send the encrypted order information to the server, so that the server performs validity verification on the order information according to the encrypted hash value, and performs payment processing according to the encrypted order information if the verification succeeds.

Optionally, the first terminal further includes:

a display module, configured to display an identity verification form selection interface, the identity verification form selection interface displaying at least a first identity verification form, and the first identity verification form being a form for identity verification by means of the second terminal; and an enable module, configured to enable the short-range communication component when receiving a selection instruction corresponding to the first identity verification form.

Optionally, the first terminal further includes:

a disable module, configured to disable the short-range communication component if no payment instruction corresponding to another order is received within a preset period of time.

The specific manners of performing operations by the various modules of the apparatuses in the foregoing embodiments are described in detail in the embodiments related to the methods, and are not further described in detail herein.

In the embodiments of the present invention, order information sent by a first terminal is received by means of a short-range communication component, the order information including an account identifier of a paid object account and a payment amount, an account identifier of a first account prestored at the second terminal and bound thereto is acquired as an account identifier of a payout account and the account identifier of the payout account is added to the order information, encryption processing is performed, by using a prestored first key, on the order information to which the account identifier of the payout account is added, and the encrypted order information is sent to the first terminal by means of the short-range communication component, so that the first terminal sends the encrypted order information to a server and the server performs payment processing according to the encrypted order information. In this way, a user can process the order information without entering information about a payment account, a payment password, or the like. Therefore the efficiency of order information processing can be improved.

Embodiment 4

Based on the same technical concept, embodiments of the present invention further provide a system for processing order information. The system includes a first terminal and a second terminal.

The second terminal is configured to: receive, by means of a short-range communication component, order information sent by the first terminal, the order information including an account identifier of a paid object account and a payment amount; acquire an account identifier of a first account prestored at the second terminal and bound thereto as an account identifier of a payout account and add the account identifier of the payout account to the order information; perform encryption processing, by using a prestored first key, on the order information to which the account identifier of the payout account is added; and send, by means of the short-range communication component, the encrypted order information to the first terminal.

The first terminal is configured to: receive a payment instruction corresponding to a target order; send, by means of a short-range communication component, order information of the target order to the second terminal; receive, by means of the short-range communication component, the encrypted order information sent by the second terminal; and send the encrypted order information to a server, so that the server performs payment processing according to the encrypted order information.

In the embodiments of the present invention, order information sent by a first terminal is received by means of a short-range communication component, the order information including an account identifier of a paid object account and a payment amount, an account identifier of a first account prestored at the second terminal and bound thereto is acquired as an account identifier of a payout account and the account identifier of the payout account is added to the order information, encryption processing is performed, by using a prestored first key, on the order information to which the account identifier of the payout account is added, and the encrypted order information is sent to the first terminal by means of the short-range communication component, so that the first terminal sends the encrypted order information to a server and the server performs payment processing according to the encrypted order information. In this way, a user can process the order information without entering information about a payment account, a payment password, or the like. Therefore the efficiency of order information processing can be improved.

Embodiment 5

Figure 9:
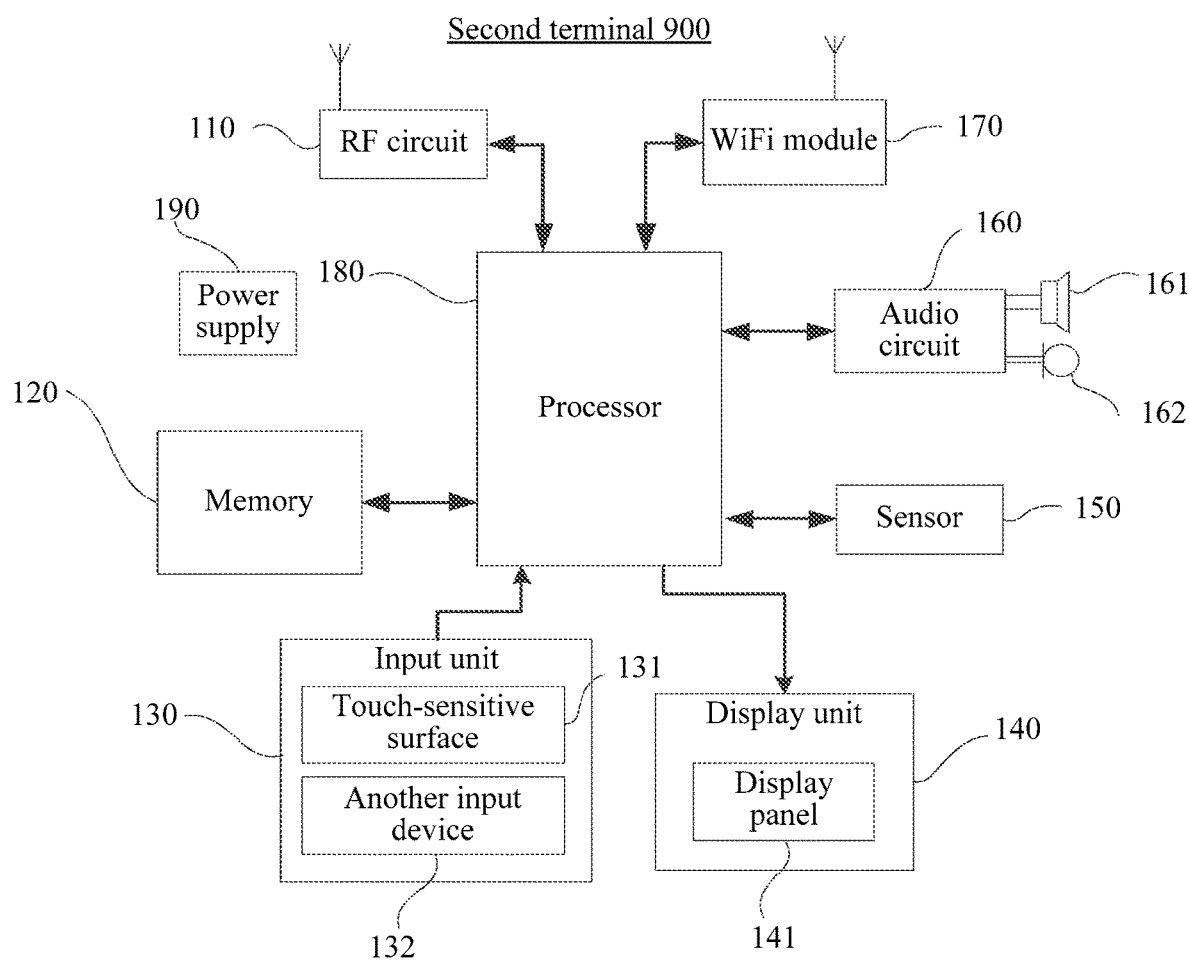
FIG. 9 is a schematic structural diagram of a second terminal according to an exemplary embodiment.

FIG. 9 is a schematic structural diagram of a second terminal according to an exemplary embodiment. The second terminal may be configured to implement the method for processing order information provided in the foregoing embodiments.

A second terminal 900 may include such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art may understand that the structure of the second terminal shown in FIG. 9 does not constitute a limitation to the second terminal, and the second terminal may include more components or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to the processor 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the second terminal 900, and the like. In addition, the memory 120 may include a high speed random access memory, and may also include a non-transitory computer readable storage medium such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the second terminal 900. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 9, the touch-sensitive surface 131 and the display panel 141 are used as two separate parts to implement input and output functions, in some embodiments, the touch-sensitive surface 131 and the display panel 141 may be integrated to implement the input and output functions.

The second terminal 900 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the second terminal 900 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the second terminal 900, are not further described herein.

The audio circuit 160, a speaker 161, and a microphone 162 may provide audio interfaces between the user and the second terminal 900. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another second terminal by using the RF circuit 110, or outputs the audio data to the memory 120 for further processing. The audio circuit 160 may further include an earplug jack, so as to provide communication between a peripheral earphone and the second terminal 900.

WiFi is a short distance wireless transmission technology. The second terminal 900 may help, by using the WiFi module 170, the user to receive and send emails, browse a web page, access streaming media, and so on, which provides wireless broadband interne access for the user. Although FIG. 9 shows the WiFi module 170, it may be understood that the WiFi module 170 is not a necessary component of the second terminal 900, and when required, the WiFi module 170 may be omitted as long as the scope of the essence of the present disclosure is not changed.

The processor 180 is the control center of the second terminal 900, and is connected to various parts of the mobile phone by using various interfaces and lines. By running or executing the software program and/or module stored in the memory 120, and invoking data stored in the memory 120, the processor 180 performs various functions and data processing of the second terminal 900, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may either not be integrated into the processor 180.

The second terminal 900 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the second terminal 900 may further include a camera, a Bluetooth module, and the like, which are not further described herein. Specifically, in this embodiment, the display unit of the second terminal 900 is a touchscreen display, and the second terminal 900 further includes a memory and one or more programs. The one or more programs are stored in the memory and configured to be executed by one or more processors. The one or more programs contain instructions used for implementing the method for processing order information according to the embodiments of the present invention.

In an exemplary embodiment, a non-transitory computer readable storage medium including instructions, for example, a memory including instructions, is further provided. The instructions may be executed by a processor of a mobile terminal to implement the method for processing order information. For example, the non-transitory computer readable storage medium may be a read-only memory (ROM), a random access memory (RAM), a compact disc read-only memory (CD-ROM), a magnetic tape, a floppy disk, an optical data storage device, and the like.

In the embodiments of the present invention, order information sent by a first terminal is received by means of a short-range communication component, the order information including an account identifier of a paid object account and a payment amount, an account identifier of a first account prestored at the second terminal and bound thereto is acquired as an account identifier of a payout account and the account identifier of the payout account is added to the order information, encryption processing is performed, by using a prestored first key, on the order information to which the account identifier of the payout account is added, and the encrypted order information is sent to the first terminal by means of the short-range communication component, so that the first terminal sends the encrypted order information to a server and the server performs payment processing according to the encrypted order information. In this way, a user can process the order information without entering information about a payment account, a payment password, or the like. Therefore the efficiency of order information processing can be improved.

Embodiment 6

Figure 10:
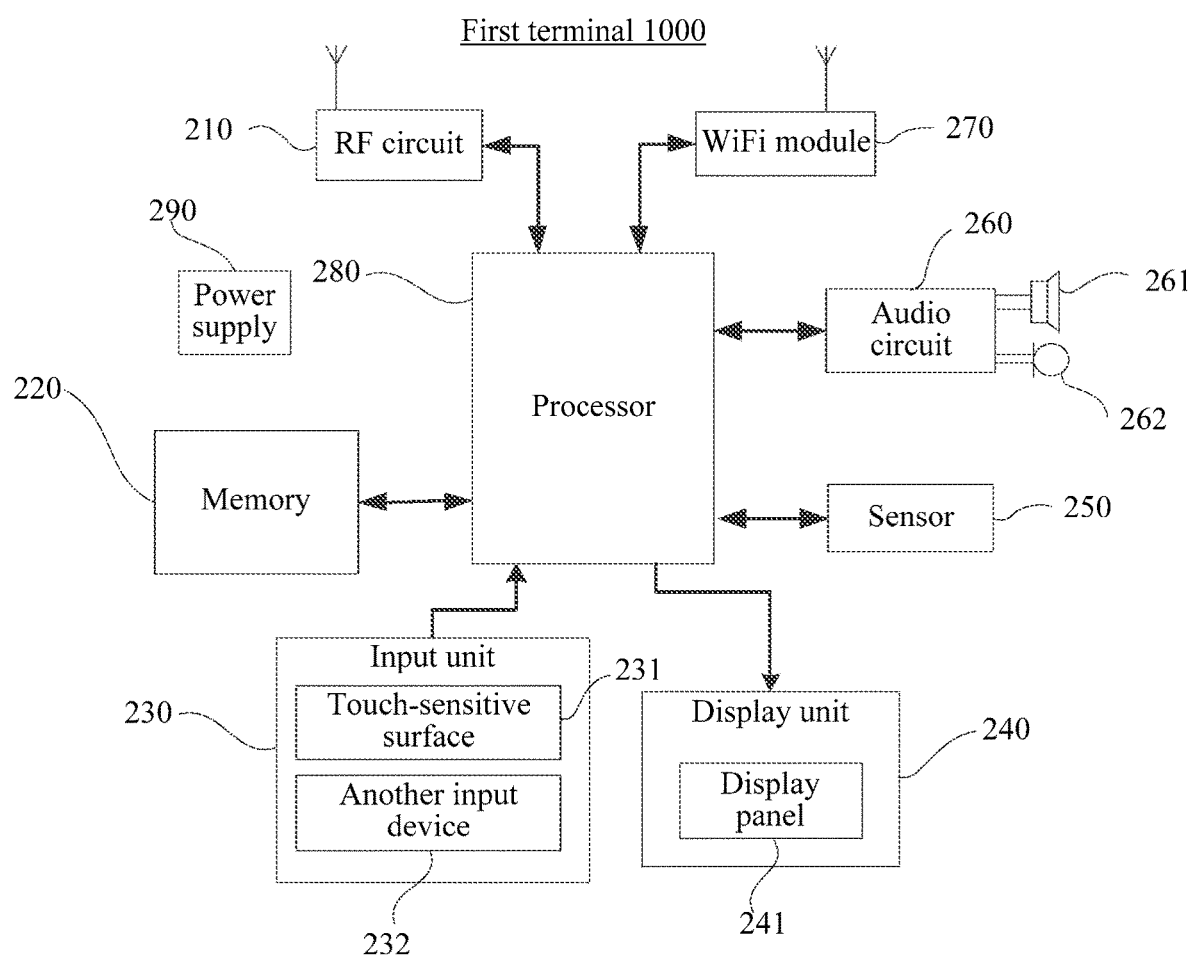
FIG. 10 is a schematic structural diagram of a first terminal according to an exemplary embodiment.

FIG. 10 is a schematic structural diagram of a first terminal according to an exemplary embodiment. The first terminal may be configured to implement the method for processing order information provided in the foregoing embodiments.

A first terminal 1000 may include such as a radio frequency (RF) circuit 210, a memory 220 including one or more computer readable storage media, an input unit 230, a display unit 240, a sensor 250, an audio circuit 260, a wireless fidelity (WiFi) module 270, a processor 280 including one or more processing cores, and a power supply 290. A person skilled in the art may understand that the structure of the first terminal shown in FIG. 10 does not constitute a limitation to the first terminal, and the first terminal may include more components or fewer components than those shown in the figure, or some components may be combined, or a different component deployment may be used.

The RF circuit 210 may be configured to receive and send signals during an information receiving and sending process or a call process. Particularly, the RF circuit 110 receives downlink information from a base station, then delivers the downlink information to the processor 280 for processing, and sends related uplink data to the base station. Generally, the RF circuit 210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 210 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 220 may be configured to store a software program and module. The processor 280 runs the software program and module stored in the memory 220, to implement various functional applications and data processing. The memory 220 may mainly include a program storage area and a data storage area. The program storage area may store an operating system, an application program required by at least one function (such as a sound playback function and an image display function), and the like. The data storage area may store data (such as audio data and an address book) created according to use of the first terminal 1000, and the like. In addition, the memory 220 may include a high speed random access memory, and may also include a non-transitory computer readable storage medium such as at least one magnetic disk storage device, a flash memory, or another volatile solid-state storage device. Correspondingly, the memory 220 may further include a memory controller, so as to provide access of the processor 280 and the input unit 230 to the memory 220.

The input unit 230 may be configured to receive input digit or character information, and generate a keyboard, mouse, joystick, optical, or track ball signal input related to the user setting and function control. Specifically, the input unit 230 may include a touch-sensitive surface 231 and another input device 232. The touch-sensitive surface 231, which may also be referred to as a touchscreen or a touch panel, may collect a touch operation of a user on or near the touch-sensitive surface (such as an operation of a user on or near the touch-sensitive surface 231 by using any suitable object or accessory, such as a finger or a stylus), and drive a corresponding connection apparatus according to a preset program. Optionally, the touch-sensitive surface 231 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 280. Moreover, the touch controller can receive and execute a command sent from the processor 280. In addition, the touch-sensitive surface 231 may be may be a resistive, capacitive, infrared, or surface sound wave type touch-sensitive surface. In addition to the touch-sensitive surface 231, the input unit 230 may further include the another input device 232. Specifically, the another input device 232 may include, but is not limited to, one or more of a physical keyboard, a functional key (such as a volume control key or a switch key), a track ball, a mouse, and a joystick.

The display unit 240 may be configured to display information input by the user or information provided for the user, and various graphical user interfaces of the first terminal 1000. The graphical user interfaces may be formed by a graph, a text, an icon, a video, or any combination thereof. The display unit 240 may include a display panel 241. Optionally, the display panel 241 may be configured by using a liquid crystal display (LCD), an organic light-emitting diode (OLED), or the like. Further, the touch-sensitive surface 231 may cover the display panel 241. After detecting a touch operation on or near the touch-sensitive surface 231, the touch-sensitive surface 231 transfers the touch operation to the processor 280, so as to determine the type of the touch event. Then, the processor 280 provides a corresponding visual output on the display panel 241 according to the type of the touch event. Although, in FIG. 10, the touch-sensitive surface 231 and the display panel 241 are used as two separate parts to implement input and output functions, in some embodiments, the touch-sensitive surface 231 and the display panel 241 may be integrated to implement the input and output functions.

The first terminal 1000 may further include at least one sensor 250, such as an optical sensor, a motion sensor, and other sensors. Specifically, the optical sensor may include an ambient light sensor and a proximity sensor. The ambient light sensor can adjust luminance of the display panel 241 according to brightness of the ambient light. The proximity sensor may switch off the display panel 241 and/or backlight when the first terminal 1000 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the first terminal 1000, are not further described herein.

The audio circuit 260, a speaker 261, and a microphone 262 may provide audio interfaces between the user and the first terminal 1000. The audio circuit 260 may convert received audio data into an electric signal and transmit the electric signal to the speaker 261. The speaker 261 converts the electric signal into a sound signal for output. On the other hand, the microphone 262 converts a collected sound signal into an electric signal. The audio circuit 260 receives the electric signal and converts the electric signal into audio data, and outputs the audio data to the processor 280 for processing. Then, the processor 280 sends the audio data to, for example, another first terminal by using the RF circuit 210, or outputs the audio data to the memory 220 for further processing. The audio circuit 260 may further include an earplug jack, so as to provide communication between a peripheral earphone and the first terminal 1000.

WiFi is a short distance wireless transmission technology. The first terminal 1000 may help, by using the WiFi module 270, the user to receive and send emails, browse a web page, access streaming media, and so on, which provides wireless broadband interne access for the user. Although FIG. 10 shows the WiFi module 270, it may be understood that the WiFi module 270 is not a necessary component of the first terminal 1000, and when required, the WiFi module 270 may be omitted as long as the scope of the essence of the present disclosure is not changed.

The processor 280 is the control center of the first terminal 1000, and is connected to various parts of the mobile phone by using various interfaces and lines. By running or executing the software program and/or module stored in the memory 220, and invoking data stored in the memory 220, the processor 280 performs various functions and data processing of the first terminal 1000, thereby performing overall monitoring on the mobile phone. Optionally, the processor 280 may include one or more processing cores. Preferably, the processor 280 may integrate an application processor and a modem. The application processor mainly processes an operating system, a user interface, an application program, and the like. The modem mainly processes wireless communication. It may be understood that the foregoing modem may either not be integrated into the processor 280.

The first terminal 1000 further includes the power supply 290 (such as a battery) for supplying power to the components. Preferably, the power supply may be logically connected to the processor 280 by using a power management system, thereby implementing functions such as charging, discharging and power consumption management by using the power management system. The power supply 290 may further include one or more of a direct current or alternating current power supply, a re-charging system, a power failure detection circuit, a power supply converter or inverter, a power supply state indicator, and any other components.

Although not shown in the figure, the first terminal 1000 may further include a camera, a Bluetooth module, and the like, which are not further described herein. Specifically, in this embodiment, the display unit of the first terminal 1000 is a touchscreen display, and the first terminal 1000 further includes a memory and one or more programs. The one or more programs are stored in the memory and configured to be executed by one or more processors. The one or more programs contain instructions used for implementing the method for processing order information according to the embodiments of the present invention.

In an exemplary embodiment, a non-transitory computer readable storage medium including instructions, for example, a memory including instructions, is further provided. The instructions may be executed by a processor of a mobile terminal to implement the method for processing order information. For example, the non-transitory computer readable storage medium may be a read-only memory (ROM), a random access memory (RAM), a compact disc read-only memory (CD-ROM), a magnetic tape, a floppy disk, an optical data storage device, and the like.

In the embodiments of the present invention, order information sent by a first terminal is received by means of a short-range communication component, the order information including an account identifier of a paid object account and a payment amount, an account identifier of a first account prestored at the second terminal and bound thereto is acquired as an account identifier of a payout account and the account identifier of the payout account is added to the order information, encryption processing is performed, by using a prestored first key, on the order information to which the account identifier of the payout account is added, and the encrypted order information is sent to the first terminal by means of the short-range communication component, so that the first terminal sends the encrypted order information to a server and the server performs payment processing according to the encrypted order information. In this way, a user can process the order information without entering information about a payment account, a payment password, or the like. Therefore the efficiency of order information processing can be improved.

After considering the specification and practicing the present disclosure, a person skilled in the art would easily conceive of other implementations of the embodiments of the present invention. This application is intended to cover any variations, uses, or adaptive changes of the embodiments of the present invention. Such variations, uses, or adaptive changes follow the general principles of the embodiments of the present invention and include common general knowledge or common technical means in the art that is not described in the embodiments of the present invention. The specification and the embodiments are merely exemplary, and the real scope and spirit of the embodiments of the present invention are set forth in the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A method for processing order information performed at a second terminal having one or more processors and memory storing a plurality of programs executed by the one or more processors, the method comprising:
   enabling a short-range communication component with a first terminal in response to an instruction from a user of the second terminal, the second terminal being a smart bracelet, and the first terminal being a mobile terminal used for payment;
   receiving, by means of the short-range communication component, order information sent by the first terminal, the order information comprising an account identifier of a seller account and a payment amount, and a hash value of the order information of a target order;
   acquiring an account identifier of a first account prestored at the second terminal corresponding to an account identifier of a payment account and adding the account identifier of the payment account to the order information, the account identifier of the payment account includes information about a bank card number bound to the payment account;
   generating, by the second terminal, a key pair including a private key stored in the second terminal and a public key transmitted through the first terminal to a payment server, wherein the payment server verifies the encrypted order information using the public key;
   after receiving a payment confirmation from the user of the second terminal, performing encryption processing, by using the prestored private key, on the order information to which the account identifier of the payment account is added; and
   sending, by means of the short-range communication component, the encrypted order information to the first terminal.

2. The method according to claim 1, further comprising:
   displaying an identity verification form selection interface, the identity verification form selection interface displaying at least a first identity verification form, and the first identity verification form being a form for identity verification by means of the second terminal; and
   enabling the short-range communication component when receiving a selection instruction corresponding to the first identity verification form.

3. The method according to claim 1, wherein the operation of acquiring an account identifier of a first account prestored at the second terminal and bound thereto as an account identifier of a payout account and adding the account identifier of the payout account to the order information comprises:
   displaying the order information of the target order and a payment confirmation option corresponding to the target order;
   acquiring the account identifier of the first account prestored at the second terminal and bound thereto as the account identifier of the payout account; and
   adding the account identifier of the payout account to the order information when a tap instruction corresponding to the payment confirmation option is received.

4. The method according to claim 3, wherein the operation of displaying the order information of the target order and a payment confirmation option corresponding to the target order comprises:
   in accordance with a determination that unlocking information entered by a user matches prestored unlocking information at the second terminal, changing from a locked state to an unlocked state and displaying the order information of the target order and the payment confirmation option corresponding to the target order.

5. The method according to claim 1, wherein the operation of sending, by means of the short-range communication component, the encrypted order information to the first terminal comprises:
   sending, by means of the short-range communication component, encrypted order information to which the account identifier of the payout account is added to the first terminal.

6. The method according to claim 5, further comprising:
   disabling the short-range communication component when no other order information sent by the first terminal is received within a preset period of time after sending, by means of the short-range communication component, the encrypted order information to the first terminal.

7. A second terminal, comprising:
   one or more processors;
   memory; and
   a plurality of programs stored in the memory, wherein the plurality of programs, when executed by the one or more processors, cause the second terminal to perform a plurality of operations including:
   enabling a short-range communication component with a first terminal in response to an instruction from a user of the second terminal, the second terminal being a smart bracelet;
   receiving, by means of the short-range communication component, order information sent by the first terminal, the order information comprising an account identifier of a seller account and a payment amount and a hash value of the order information of a target order;
   acquiring an account identifier of a first account prestored at the second terminal corresponding to an account identifier of a payment account and adding the account identifier of the payment account to the order information, the account identifier of the payment account includes information about a bank card number bound to the payment account;

generating, by the second terminal, a key pair including a private key stored in the second terminal and a public key transmitted through the first terminal to a payment server, wherein the payment server verifies the encrypted order information using the public key;

after receiving a payment confirmation from the user of the second terminal, performing encryption processing, by using the prestored private key, on the order information to which the account identifier of the payment account is added; and sending, by means of the short-range communication component, the encrypted order information to the first terminal.

8. The second terminal according to claim 7, wherein the plurality of operations further include:

receiving, from a user of the second terminal, an enable instruction corresponding to the short-range communication component and enabling the short-range communication component before receiving, by means of the short-range communication component, the order information sent by the first terminal.

9. The second terminal according to claim 8, wherein the plurality of operations further include:

displaying an identity verification form selection interface, the identity verification form selection interface displaying at least a first identity verification form, and the first identity verification form being a form for identity verification by means of the second terminal; and enabling the short-range communication component when receiving a selection instruction corresponding to the first identity verification form.

10. The second terminal according to claim 7, wherein the operation of acquiring an account identifier of a first account prestored at the second terminal and bound thereto as an account identifier of a payout account and adding the account identifier of the payout account to the order information comprises:

displaying the order information of a target order and a payment confirmation option corresponding to the target order;

acquiring the account identifier of the first account prestored at the second terminal and bound thereto as the account identifier of the payout account; and adding the account identifier of the payout account to the order information when a tap instruction corresponding to the payment confirmation option is received.

11. The second terminal according to claim 10, wherein the operation of displaying the order information of the target order and a payment confirmation option corresponding to the target order comprises:

in accordance with a determination that unlocking information entered by a user matches prestored unlocking information at the second terminal, changing from a locked state to an unlocked state and displaying the order information of the target order and the payment confirmation option corresponding to the target order.

12. The second terminal according to claim 7, wherein the operation of sending, by means of the short-range communication component, the encrypted order information to the first terminal comprises:

sending, by means of the short-range communication component, encrypted order information to which the account identifier of the payout account is added to the first terminal.

13. The second terminal according to claim 12, wherein the plurality of operations further include:

disabling the short-range communication component when no other order information sent by the first terminal is received within a preset period of time after sending, by means of the short-range communication component, the encrypted order information to the first terminal.

14. A non-transitory computer readable storage medium associated with a second terminal having one or more processors storing a plurality of programs that, when executed by the one or more processors, cause the second terminal to perform a plurality of operations including:

enabling a short-range communication component with a first terminal in response to an instruction from a user of the second terminal, the second terminal being a smart bracelet;

receiving, by means of the short-range communication component, order information sent by the first terminal, the order information comprising an account identifier of a seller account and a payment amount and a hash value of the order information of a target order;

acquiring an account identifier of a first account prestored at the second terminal corresponding to an account identifier of a payment account and adding the account identifier of the payment account to the order information, the account identifier of the payment account includes information about a bank card number bound to the payment account;

generating, by the second terminal, a key pair including a private key stored in the second terminal and a public key transmitted through the first terminal to a payment server, wherein the payment server verifies the encrypted order information using the public key;

after receiving a payment confirmation from the user of the second terminal, performing encryption processing, by using the prestored private key, on the order information to which the account identifier of the payment account is added; and sending, by means of the short-range communication component, the encrypted order information to the first terminal.

15. The non-transitory computer readable storage medium according to claim 14, wherein the plurality of operations further include:

receiving, from a user of the second terminal, an enable instruction corresponding to the short-range communication component and enabling the short-range communication component before receiving, by means of the short-range communication component, the order information sent by the first terminal.

16. The non-transitory computer readable storage medium according to claim 15, wherein the plurality of operations further include:

displaying an identity verification form selection interface, the identity verification form selection interface displaying at least a first identity verification form, and the first identity verification form being a form for identity verification by means of the second terminal; and enabling the short-range communication component when receiving a selection instruction corresponding to the first identity verification form.

17. The non-transitory computer readable storage medium according to claim 14, wherein the operation of acquiring an account identifier of a first account prestored at the second terminal and bound thereto as an account identifier of a payout account and adding the account identifier of the payout account to the order information comprises:

displaying the order information of a target order and a payment confirmation option corresponding to the target order;

acquiring the account identifier of the first account pre-stored at the second terminal and bound thereto as the account identifier of the payout account; and adding the account identifier of the payout account to the order information when a tap instruction corresponding to the payment confirmation option is received.

* * * * *